United States Patent [19]

Hansson

[11] 4,190,147
[45] Feb. 26, 1980

[54] DEVICE FOR TRANSPORT OF BULK MATERIAL OR THE LIKE

[76] Inventor: Hans M. Hansson, Mölneby, Basgården, Överlida, Sweden, 510 60

[21] Appl. No.: 824,820

[22] Filed: Aug. 15, 1977

[51] Int. Cl.$^2$ ............................................. B65G 25/10
[52] U.S. Cl. .................................... 198/746; 198/748; 198/749; 414/293
[58] Field of Search ............... 198/746, 747, 748, 749, 198/585; 214/17 C; 104/235; 414/293

[56] References Cited

U.S. PATENT DOCUMENTS

| | | | |
|---|---|---|---|
| 2,879,907 | 3/1959 | Mickel | 198/746 X |
| 3,188,977 | 6/1965 | Viktorsson | 104/235 |
| 3,409,120 | 11/1968 | Van Huis | 198/746 |
| 3,727,747 | 4/1973 | Damm | 198/747 |

FOREIGN PATENT DOCUMENTS 138053  11/1952  Sweden ..................... 198/746

*Primary Examiner*—Robert B. Reeves
*Assistant Examiner*—Douglas D. Watts

[57] ABSTRACT

A device for moving bulk material collected along the length of a chute to a container located outside and below one end of the chute, comprises in combination a scraper means which is brought to reciprocate along the chute the scraper means being arranged to transport the bulk material during its forward motion against said container, the arrangement being such that the scraper means is adapted to project cantilever-wise outside the chute before its forward motion is concluded, means being provided to let the scraper means be lowered during the end period of the forward motion to a level below the chute, further means being arranged to place the scraper means in a position where it will be free during the return movement away from the container to move at a level above material residing in the chute and thereby not moving the the bulk material in both directions.

2 Claims, 5 Drawing Figures

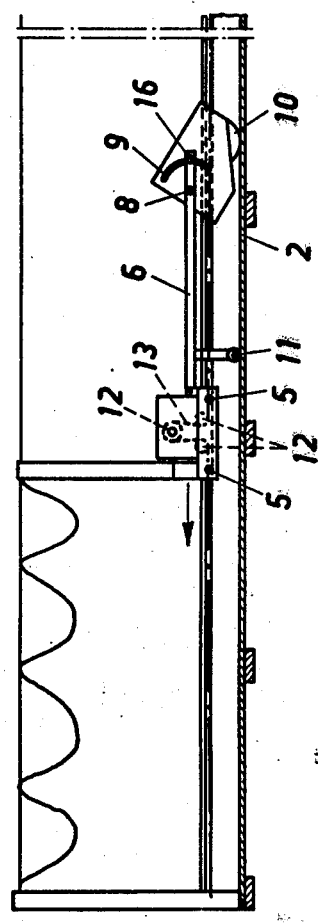
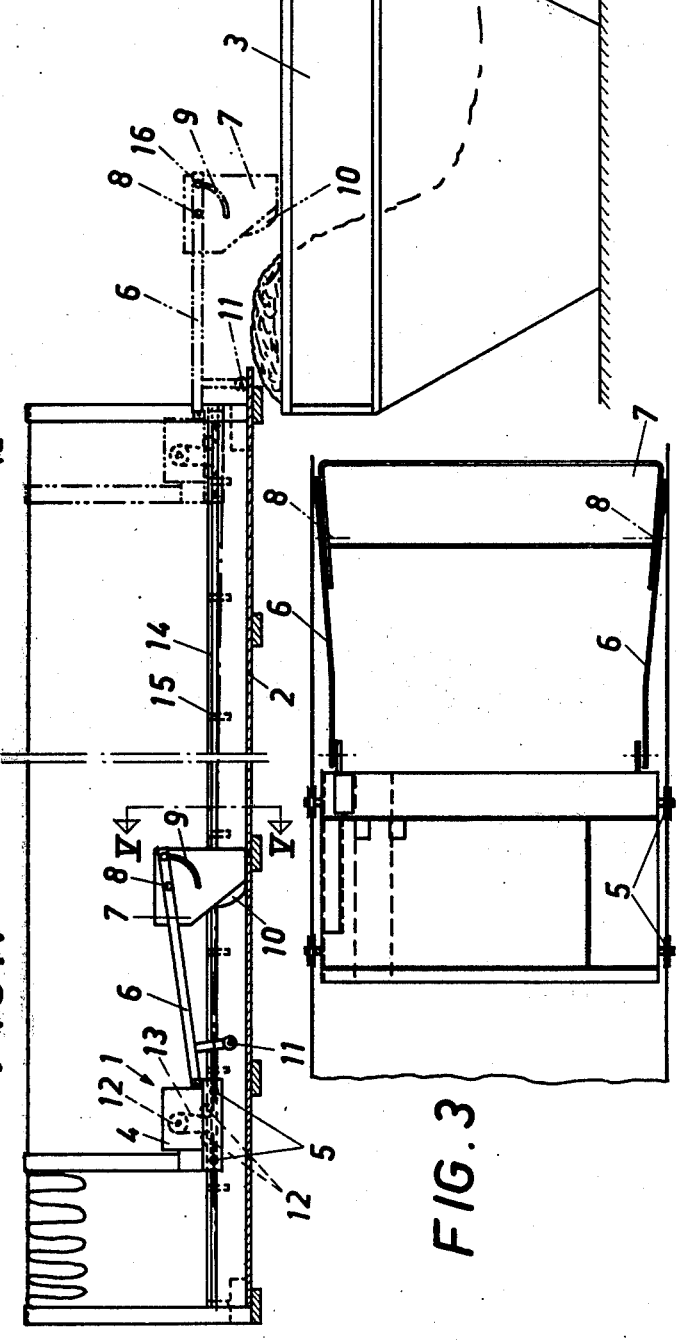
FIG. 2
FIG. 1
FIG. 3

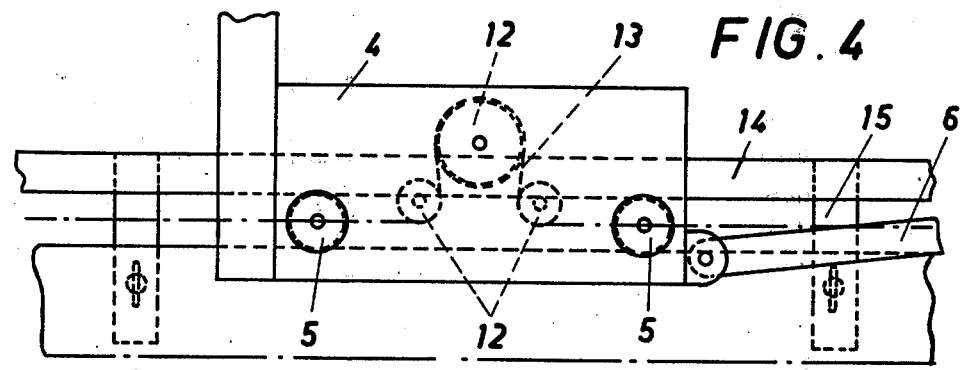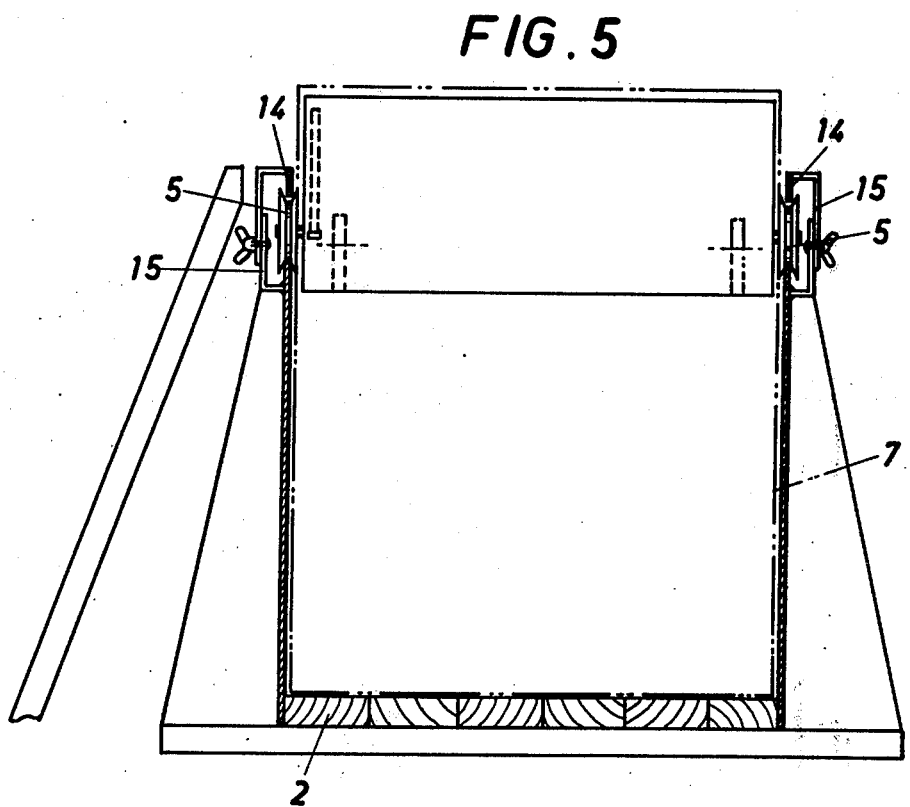

DEVICE FOR TRANSPORT OF BULK MATERIAL OR THE LIKE

BACKGROUND OF THE INVENTION

The present invention refers to a device for transport of bulk material or the like along a path e.g. a chute, to a collecting position, e.g. a container, by use of a feeder which is reciprocable along said path and which is provided with a scraper arranged to slide along the bottom of said path for pushing the bulk material in front of it during the forward motion of said feeder.

Transport devices of such type are used especially at inlet screens for water purification plants, power stations and the like where a continuous cleaning of the screens is required and where the collected material is deposited along the entire screen length in a chute of the type specified here above.

Such transport devices must work all around the year with a minimum of maintenance and a very reliable design is therefore required. During the cleaning of the chute it sometimes will happen that all the material is not scrapped away and that the scrapper at its return stroke will push this residual material to the opposite end of the chute where it due to space aspects is seldome possible to locate a second container. A considerable heap can thus be formed during a comparatively short time and this heap will grow in the transport direction of the chute and cause the effective cleaning length thereof to become shorter and shorter. Another drawback at a transport device of the above mentioned type is that the material when it by the scraper is pushed along the chute and down into a container at the end of the chute, in the container will form a heap nearest to the chute end and this will make a consecutive feeding out more difficult or even impossible.

SUMMARY OF THE INVENTION

The purpose of the invention is to eliminate the above mentioned drawbacks and to provide a transport device capable of producing a more uniform dispersion in the container of the material transported and which device is arranged during its return stroke not to take along anything of the material which eventually has been left behind in the chute during the forward stroke of the scraper. This task has been solved thereby that the scraper is arranged to project cantileverwise outside the end edge of the path in the forward end position of said path, and that means are arranged to lower the scraper in this position to a level somewhat below the bottom of the path and that the scraper is arranged during the return motion of the feeder to be tilted by influence of said path such that the scraping edge of the scraper is raised from the bottom of the path.

Due to the fact that the scraper is brought a certain distance outside the forward edge of the chute and there is tilted downwards is obtained a dispersion and scattering of the material which has possibly been gathered in a heap in the container at the end of the chute. At the return stroke of the feeder the scraper will slide on runners provided thereon and it is thereby avoided that material which has been left in the chute will follow the scraper during its return motion.

BRIEF DESCRIPTION OF THE DRAWINGS

FIG. 1 shows a longitudinal section through a transport device according to the invention, with the inner end position of the feeder shown in continuous lines, and the outer end position thereof shown in dash and dot lines, FIG. 2 shows in a view similar to FIG. 1 the transport device during its return stroke, FIG. 3 is a plan view of the transport device, FIG. 4 shows in larger scale a portion of the transport device, and FIG. 5 is an enlarged section along line V—V in FIG. 1.

DESCRIPTION OF THE PREFERRED EMBODIMENT

The transport device includes a feeder 1, intended to transport material which has been gathered in a chute 2 to a container 3, arranged at the end of the chute. The feeder 1 comprises a trolley 4 provided with wheels 5, which run on the edges of the chute 2. At the front end of the trolley 4 there are pivotably connected two arms 6, which are directed forwardly and the free ends of which are designed to carry a scraper 7. The scraper is pivotable to a limited extent about bearing journals 8 at the arms 6 and it is provided with arch formed grooves 9 for guiding pins 16, which limit the pivotability of the scraper. The scraper 7 is further provided with runners 10 on which the scraper will slide at the return movement of the feeder. During the forward motion of the feeder the arms are inclined somewhat upwards whereas they during the return stroke of the feeder are kept substantially horizontal. Supporting rollers 11 are arranged below the arms 6. During the forward motion of the feeder are these rollers raised from the bottom of the chute 2, whereas they during the return stroke run in the chute. The trolley 4 is provided with a drive wheel 12 and idler wheels 12a around which a chain 13 is arranged to extend along the entire length of the chute 2. The trolley is maintained in correct lateral position by the wheels 5 being provided with peripheral grooves and the trolley is prevented from being raised by guiding rails 14 arranged above the edges of the chute and which rails enter into the grooves of the wheels. The guiding rails 14 are fixed to the chute 2 via angle irons 15.

At the forward stroke of the feeder the scraper 7 will push the material gathered in the chute 2 along the chute and down into the container 3. The forward motion of the feeder will continue and the scraper will be moved outside the end of the shoot where it will tilt downwards until the support rollers 11 rest against the bottom of the chute. As the scraper 7 is moved out over the container 3 it will push away the material, which has gathered in a heap below the end of the chute. The material will hereby be more uniformly distributed and dispersed in the container. When the feeder reaches the position shown in dash and dot lines in FIG. 1 its motion is interrupted by a limit switch and it will start its return stroke. When the scraper 7 during the forward stroke reaches the end of the chute 2 is if tilted to the position shown in FIG. 2 and it will thereupon slide with its runners 10 against the chute. It is hereby avoided that material which is left behind in the chute will follow the scraper at its return stroke, either this material is such that has been collected in the chute after the transport operation or such which by any reason has not been pushed to the container by the scraper during its forward stroke. The scraper will instead slide over such material. When the feeder reaches its rear end position the trolley motor is reversed and the scraper 7 is tilted back to the position shown in FIG. 1, and a new transport operation starts. The invention is not limited to the embodiment specified hereabove but can be varied within the scope of the appended claims.

What I claim is:

1. A transfer device for moving bulk material along a path to a collecting receptacle comprising an elongated chute having a surface defining said path, said surface including an inner end and a material discharge end, a trolley mounted for longitudinal reciprocating movement along said chute, elongated arm means pivoted to said trolley and extending longitudinally of said chute, a scraper assembly including scraping means pivoted to said arm means at a distance from said trolley, guide means depending from said arm means for engagement with said surface and drive means for moving said trolley along said chute between a first end position adjacent said inner end of said surface in which first position said scraping means engages said surface and said guide means is clear of said surface and a second end position in which said guide means engages said surface adjacent said discharge end and said scraping means projects beyond said discharge end below the level of said surface, movement of said trolley from said first to said second end position causing the scraping means to scrape said surface, move off the discharge end of said surface and drop below the level of said surface until said guide means engages said surface, and movement of the trolley from said second to said first end position causing said scraper assembly to engage the chute at said discharge end of said surface and pivot said assembly relative to said arm means into a position in which said scraping means is clear of said surface, said scraper assembly further including projecting means engaging said surface during subsequent return movement of the trolley to said first end position for retaining the scraping means clear of said surface wherein said trolley includes guide wheels with peripheral grooves and said chute includes track means having upper and lower sections received in said grooves.

2. The device of claim 1 wherein said drive means includes a chain extending longitudinally of said chute, a drive wheel on said trolley engaging said chain and means for rotating said guide wheel to move the trolley back and forth along said chain.

* * * * *